M. G. SLEMMONS.
Plows.
No. 6,131. Reissued Nov. 10, 1874.
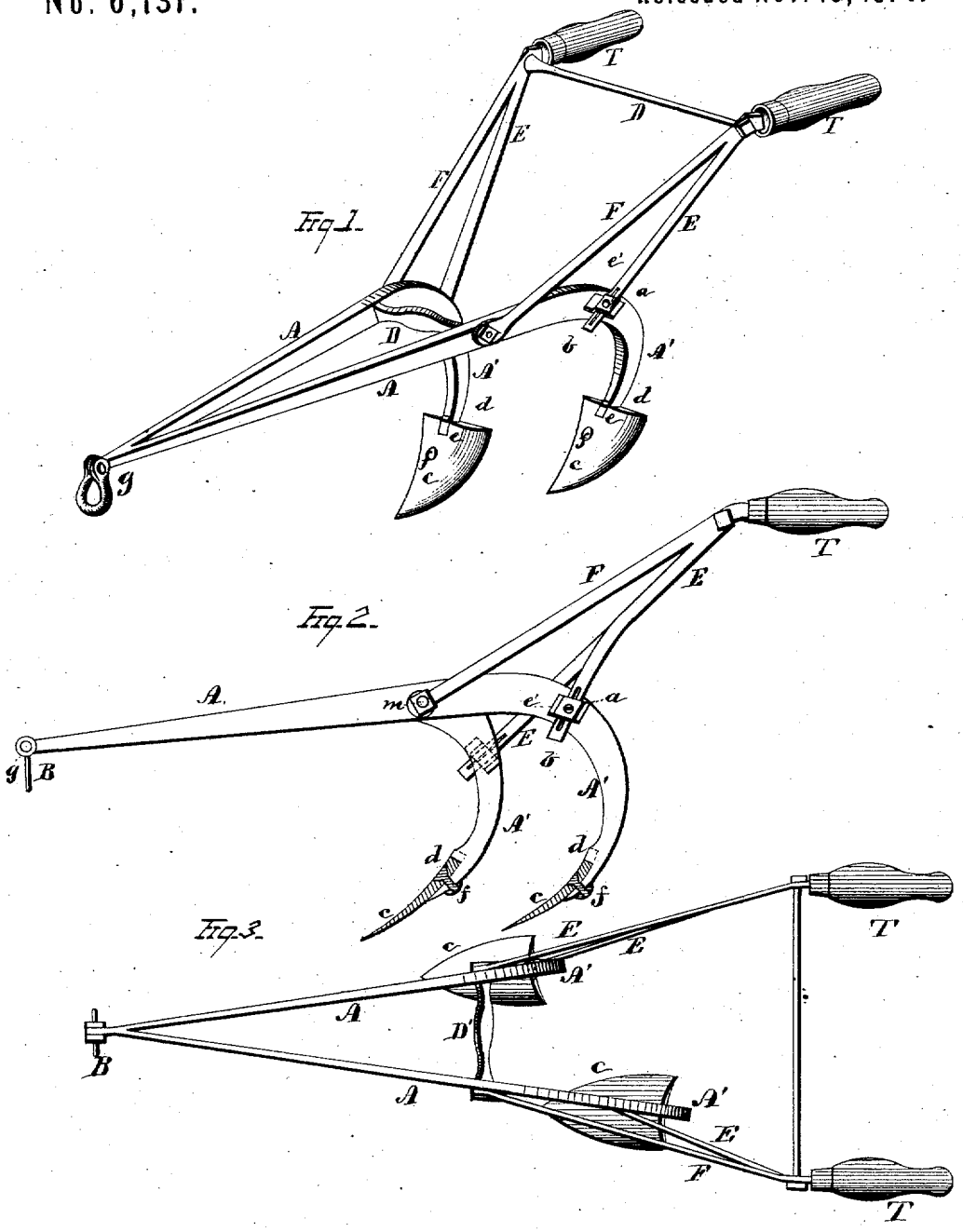
WITNESSES
W. T. Newman
R. M. Barr
By Leggett & Leggett, Attorneys.
INVENTOR
Matthew G. Slemmons
THE GRAPHIC CO. PHOTO-LITH. 39 & 41 PARK PLACE, N.Y.

UNITED STATES PATENT OFFICE.

MATHEW G. SLEMMONS, OF IOWA CITY, IOWA, ASSIGNOR TO LEGGETT & LEGGETT.

IMPROVEMENT IN PLOWS.

Specification forming part of Letters Patent No. 30,357, dated October 9, 1860; reissue No. 3,514, dated June 22, 1869; extended seven years; reissue No. 6,131, dated November 10, 1874; application filed October 12, 1874.

*To all whom it may concern:*

Be it known that I, MATHEW G. SLEMMONS, formerly of Cadiz, Ohio, now of Iowa City, county of Johnson, State of Iowa, have invented a new and Improved Double-Shovel Plow; and I do hereby declare that the following is a full, clear, and exact description thereof, such as will enable others skilled in the art to which my invention pertains to make and use it, reference being had to the accompanying drawings making a part of this specification, in which—

Figure 1 is a perspective view of the improved plow. Fig. 2 is a side elevation of the plow, and Fig. 3 is a plan or top view of the same.

Similar letters of reference indicate corresponding parts in the several figures.

One object of this invention is to construct a double-shovel plow whose shovels are secured to standards that are formed upon, and that form a part of, their respective beams, which latter converge toward their front ends, and have a clevis so attached to these ends that the draft of the team will act equally upon both beams, as will be hereinafter explained; and another object is to brace handles, which are applied to converging plow-beams in such manner that a rigid attachment of each handle is effected in a very simple and substantial manner. Another object is to unite the front ends of the plow-beams in such a manner that the draft-ring or clevis, by which the plow is drawn, will pull equally upon said ends, as will be hereinafter explained.

To enable others to make, understand, and use my invention, I will explain its construction and operation.

In the accompanying drawings, A A represent the metal plow-beams, which are connected together so as to converge toward their front ends, at which point these beams are suitably connected rigidly together, and provided with a clevis, B, which may be pivoted to a transverse pin, *g*, as shown in the drawings, or which may be applied in any other suitable manner; or any other suitable clevis device may be employed, whereby the plow may be connected with the draft, and whereby a strong hitching attachment is effected. By thus bringing the two beams A A together, it will be seen that the draft upon a clevis at B will operate uniformly upon both of them in drawing the plow along. Each one of the beams A A terminates at its rear end in a standard, A′, which is formed by bending the metal substantially in the manner shown in Figs. 1 and 2, so that each beam and its standard or depressed end A′ will be formed of one piece of metal, or of the same piece of metal, thereby affording great strength, and admitting of the parts being made much stronger and with greater facility than if each beam and its standard were made of separate pieces, and then secured together by bolts, rivets, or otherwise.

It is obvious that the curved form of the standards will be much stronger than an abrupt or angular shoulder, as the strain in the former instance is uniformly distributed, while in the latter instance the strain would be chiefly confined to the knee or angular shoulder. The invention is not, however, confined to the exact form of curve given to the standards shown in the drawings.

The shovels *c c*, which may be made of any suitable form, are preferably secured to the standards by shoulder-abutments *d d*, formed on the front edges of these standards, by bolts *f f*, the heads of which are countersunk into the shovels *c c*, and by recesses *e e*, which are formed in the top edges of the shovels, as shown in Fig. 1. The shoulders *d d* assist in preventing lateral, as well as upward, displacement of the shovels, and relieve the bolts *f f* from considerable strain. One of the beams A is somewhat shorter than the other, so that one shovel, *c*, will be properly in advance of the other, and the two beams A A are connected together near their rear termini by a transverse bar or tie-brace, D′, which has its ends reduced and passed through the beams, and also through the front ends of the handles F F, and upon these ends nuts are screwed, so as to hold the parts together. This bar D′ not only braces the beams and standards against outward strains, but it also holds them against lateral compression.

If desirable, provision may be made for adjusting the bar D nearer to or farther from the clevis B, for the purpose of expanding or contracting the beams and their shovel-standards more or less, as may be required. The beams A A will spring at and near their front ends sufficiently to allow of said adjustments.

The plow-handles F F are attached to the beams A A at *m m*, and secured rigidly in place at any desired angle by means of rear supports and braces E E, which are attached to the beams, or to the upper portions of the standards A′ A′, in rear of the handle-connections.

The drawings represent each handle and its support and brace made of one piece of metal by splitting a bar of metal in the form of a fork, one prong of which forms a handle, and the other the support and brace; but I do not confine myself to this mode of manufacturing the handle and their brace-supports.

The tangs, which are formed on the upper termini of the handles, receive the wooden holders T T, as shown in the drawings. The transverse bar D keeps the handles and their supporting-braces at the required distance apart. If it is desirable to provide for adjusting and setting the handles F F at different angles with respect to the plow-beams A A, to suit different plowmen, it may be done by pivoting the front ends of the handles to the ends of bar D′, and connecting the lower ends of the supporting-braces E E to the beams or standards by means of straps *a* and bolts or screws *e′*, which latter pass through oblong slots *b*, made through said braces E E, substantially as shown in the drawings, Figs. 1 and 2. By loosening the screws *e′*, the handles can be adjusted, as above stated, and it is evident that the straps *a* may be dispensed with, if desired.

Having described my invention, what I claim as new, and desire to secure by Letters Patent, is—

1. Two diverging beams, A A, that have their rear ends bent to form shovel-standards, the said beams being fastened rigidly together, substantially as described, at and springing from the point of attachment for the draft.

2. Two diverging beams, A A, that have their rear ends bent to form shovel-standards, and their front ends fastened rigidly together and merged into a device, substantially as described, whereby the plow may be attached to the draft.

3. The combination, substantially as described, with the two plow-beams A A, of the handles F F and adjustable handle-supporting braces E E.

MATHEW G. SLEMMONS.

Witnesses:

P. RANSOM,

ALBERT SHEPARD.